United States Patent
Knorr et al.

(10) Patent No.: US 11,073,173 B2
(45) Date of Patent: Jul. 27, 2021

(54) ARRANGING A COMPOSITE ELEMENT AT A COMPONENT

(71) Applicant: Elbe Flugzeugwerke GmbH, Dresden (DE)

(72) Inventors: Alexander Knorr, Coswig (DE); Frank Hörich, Dresden (DE); Egbert Gärtner, Dresden (DE)

(73) Assignee: Elbe Flugzeugwerke GmbH

( * ) Notice: Subject to any disclaimer, the term of this patent is extended or adjusted under 35 U.S.C. 154(b) by 82 days.

(21) Appl. No.: 16/261,412

(22) Filed: Jan. 29, 2019

(65) Prior Publication Data

US 2019/0242421 A1   Aug. 8, 2019

(30) Foreign Application Priority Data

Feb. 2, 2018   (DE) ..................... 10 2018 102 336.7

(51) Int. Cl.
| | |
|---|---|
| *F16B 13/12* | (2006.01) |
| *B25B 31/00* | (2006.01) |
| *F16B 5/01* | (2006.01) |
| *B25B 7/02* | (2006.01) |
| *F16B 11/00* | (2006.01) |

(52) U.S. Cl.
CPC .............. *F16B 13/126* (2013.01); *B25B 7/02* (2013.01); *B25B 31/00* (2013.01); *F16B 5/01* (2013.01); *F16B 11/006* (2013.01)

(58) Field of Classification Search
CPC ........ F16B 13/126; F16B 5/01; F16B 11/006; F16B 5/0072; B25B 31/00; B25B 7/02; B64C 1/18
See application file for complete search history.

(56) References Cited

U.S. PATENT DOCUMENTS

2006/0137294 A1 *   6/2006   Waits, Jr. .................. F16B 5/01
                                                          52/787.1

FOREIGN PATENT DOCUMENTS

| DE | 202009000017 U1 | 5/2010 |
|---|---|---|
| DE | 202009000019 U1 | 5/2010 |
| DE | 102011009334 A1 | 8/2011 |
| DE | 102013008503 A1 | 11/2014 |

* cited by examiner

*Primary Examiner* — John C Hong
(74) *Attorney, Agent, or Firm* — Lerner, David, Littenberg, Krumholz & Mentlik, LLP

(57) ABSTRACT

Disclosed here is a method for arranging at least one composite element at a component. The composite element includes a sleeve element and an insert element. The method involves: arranging the sleeve element in a bore of the component; connecting the sleeve element and the insert element so that a composite element is formed; inserting an engagement apparatus in the composite element, wherein the engagement apparatus aligns and/or assembles the sleeve element and the insert element to each other. Also disclosed here is use of an engagement apparatus and at least one composite element for arranging the composite element at a component. The at least one composite element includes a sleeve element and an insert element. The engagement apparatus aligns and/or assembles the sleeve element and the insert element to each other.

9 Claims, 7 Drawing Sheets

ARRANGING A COMPOSITE ELEMENT AT A COMPONENT

CROSS-REFERENCE TO PRIORITY APPLICATION

This application claims the benefit of, and priority to, German patent application number DE 10 2018 102 336.7, filed Feb. 2, 2018. The content of the referenced application is incorporated by reference herein.

TECHNICAL FIELD

Embodiments of the subject matter described herein relate generally to a method for arranging at least one composite element at a component and a use of an engagement apparatus for arranging the composite element at a component.

BACKGROUND

Components, for example panels with supporting core, are provided with an insert for the purpose of fixating. Assembling of such often two-part inserts at a component is usually performed by use of a hammer or a stationary press. When such a component is to be installed in an airplane, for example, such an installation of inserts at the component is difficult or not at all possible.

Additionally, when using this method in case that the components are panels with supporting core, assembling of such an insert can damage the panel with supporting core easily. Two-part inserts which are used today in the area of floor panels in airplanes, for example, must often be joined with a hammer or under the stationary press during assembly.

BRIEF SUMMARY

It is an object of the present disclosure to provide an improved method which enables joining of one or more inserts at a component efficiently, safely and fast.

This object is achieved buy a method for arranging at least one composite element at a component and use of an engagement apparatus and least one composite element for arranging the at least one composite element at a component according to one of the independent claims. It should be noted that the following described aspects for the method also apply for the use of the engagement apparatus.

According to the disclosure, a method for arranging at least one composite element at a component is provided, which comprises at least a sleeve element and at least an insert element. The method comprises the following steps: arranging the sleeve element in a bore of the component; connecting the sleeve element with the insert element, so that at least one composite element is formed; inserting an engagement apparatus in the at least one composite element, wherein the engagement apparatus aligns and/or assembles the sleeve element and the insert element to each other.

The composite element can be a two-part insert, particularly for joining of components in the aerospace industry and comprises a sleeve element and an insert element. The sleeve element is arranged in the bore of the component, for example in a floor panel in an aircraft (usually formed as panel with supporting core/sandwich panel). The sleeve element can comprise the bore completely or partially.

The sleeve element is connected with the insert element, so that a composite element is formed. Thereby the insert element is placed or arranged in the sleeve element. Such a connection can be loose at first, so that the insert element can be removed from the sleeve element.

Next, an engagement apparatus is inserted in the at least one composite element. The engagement apparatus is configured to align and/or assemble the sleeve element and the insert element to each other. For example, the engagement apparatus is aligning the sleeve element and the insert element in such a way, that the insert element and the sleeve element are substantially aligned parallel to the borehole wall.

An engagement apparatus can be, for example, a Cleco Type Fastener or a fastener (a connection element for connection of components via bores, whose preloaded force is either obtained by a spring-load or via a nut and threaded pin).

The final composite element, for its part, can then be used for fixating of the component or for other purposes.

According to the disclosure, a simple and efficient method for arranging at least one composite element at a component can be provided. Possible damages of sandwich panels by setting composite elements as in the prior art are almost eliminated with the disclosed method. Furthermore, the method is equally reproducible for each composite element, so that various composite elements, which are arranged at one component, are substantially identical.

According to an example, the engagement apparatus introduces a preload in the composite element. By transferring the preloaded force to the composite element its insert element is connected with the sleeve element. The preloaded force can be predetermined for all engagement apparatuses.

According to an example, before the sleeve element or the insert element is arranged, an adhesive can be applied in the bore and/or on the sleeve element and/or the insert element. The adhesive is, for example, high-strength epoxy adhesive. The adhesive can be applied or introduced as adhesive layer. The adhesive prevents an early fall out of the composite element, for example before the engagement apparatus is inserted into the composite element. Furthermore, the adhesive prevents intrusion of fluids, such as water or cleaning agent, contamination etc. which might damage the component from within.

According to an example, the engagement apparatus provides a self-locking mechanism or a screw-on mechanism. Such mechanism ensures that the engagement apparatus remains in the composite element.

According to an example, the engagement apparatus is inserted in the sleeve element or in the insert element. For most components, the engagement apparatus is inserted in the insert element, wherein the insert element was arranged before in the sleeve element, which on its part was arranged in a bore of the component. It is however also possible to arrange the insert element first in the bore, to insert the engagement apparatus in the insert element and only afterwards arrange the sleeve element in the bore and connect it with the insert element. The engagement apparatus can be inserted in the sleeve element, this is the case for a two-part engagement apparatus, for example, where one part of the engagement apparatus is formed as counter bearing, when the sleeve element and/or the insert element only partially fills the bore along its length. In other words, for thick components having a thickness larger than the length of the sleeve element or insert element, a two-part engagement apparatus can be employed.

According to an example, the sleeve element is arranged at one side of the bore and the insert element is arranged on the opposite side of the bore.

According to an example, the sleeve element and/or the insert element provides a flange. By the flange arrangement and retainment of the sleeve element or the insert element in the bore of the component is ensured. In some examples, also the flange of the sleeve element and/or insert element is provided with an adhesive or an adhesive layer. In some examples, the flange of the sleeve element and/or insert element can be free of adhesive.

According to an example, the engagement apparatus is provided as guiding apparatus for the at least one composite element. In some embodiments the engagement apparatus can guide the sleeve element or the insert element in the bore. This can comprise an insertion as well as an alignment of the sleeve element or the insert element.

According to an example, the engagement apparatus provides a spring force. This can be a spring/spring system, for example. The spring force can be provided mechanically or by fluids or gases or in a mixed operating principle. The spring force can be defined or undefined. For some engagement apparatuses having a preloaded spring the spring force can be specified very closely and, for example, be adjusted to the requirements of the component (soft, hard). Thereby, the arrangement of one or more composite elements is a very reproducible process. The same applies for any kind of spring force of the engagement apparatus.

According to the disclosure, also a use of an engagement apparatus and at least one composite element for arranging the at least one composite element at a component is provided, wherein the at least one composite element comprises a sleeve element and an insert element, and the engagement apparatus aligns and/or assembles the sleeve element and the insert element to each other.

The use of the engagement apparatus, for example Cleco or fasteners, for joining of composite elements, for example of two-part inserts for panels with supporting core (e.g. floor panels), ensuring an efficient and particularly secure arrangement of the composite elements. No special tooling is required because particularly in aerospace industry engagement apparatuses are usually available in any aerospace maintenance organization worldwide. Damaging of the sandwich panels is excluded by the disclosed method.

It should be noted, that the features of the embodiments of the system as well as the embodiments of a cabin segment as well as the vehicle apply vice versa. Furthermore, also those features can be freely combined with each other for which this is not stated explicitly.

These and further aspects of the disclosure will be evident with reference to the following description.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Exemplary embodiments of the invention will be described in more detail in the following with reference to the drawings. It is shown.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
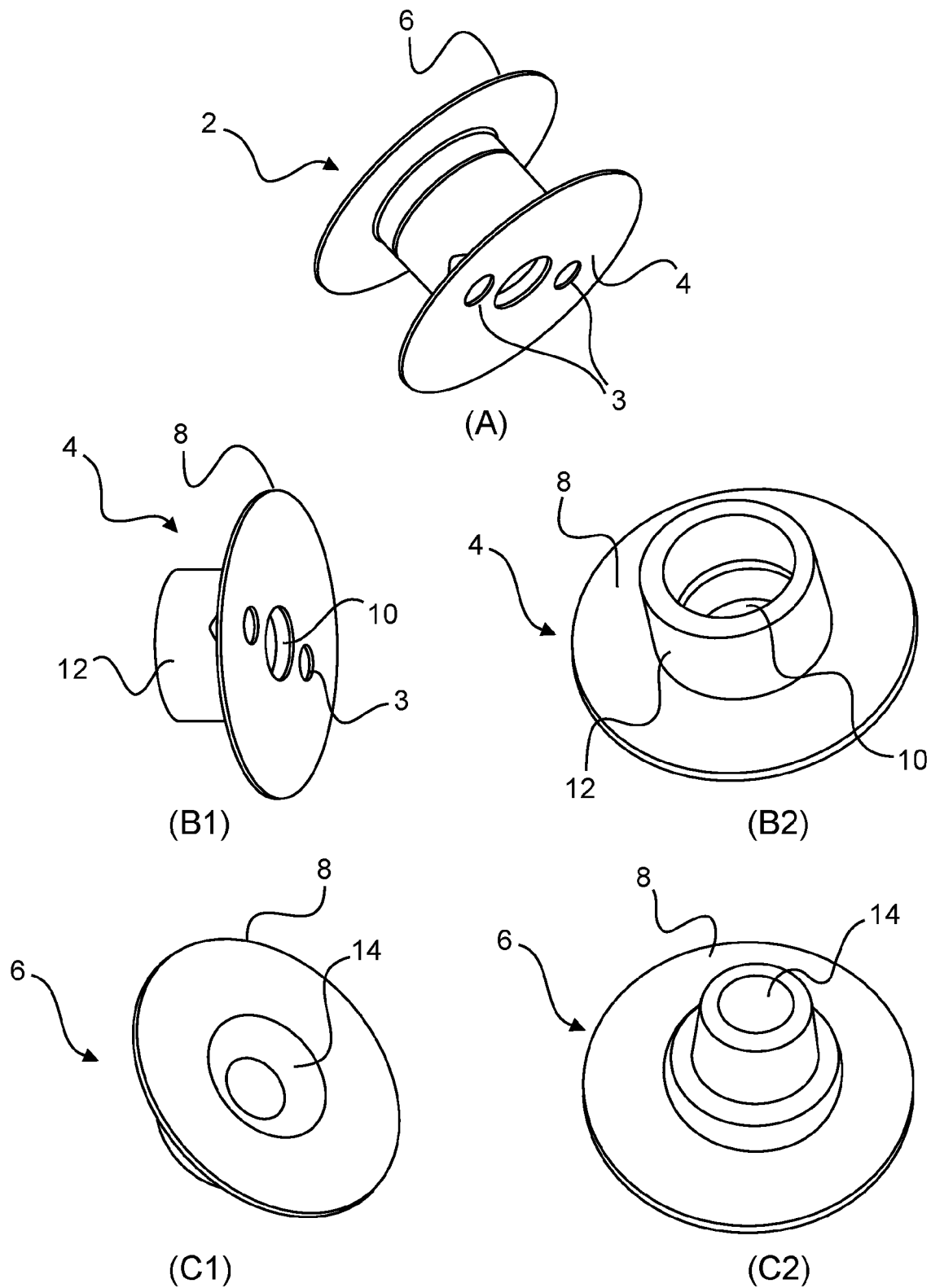
FIG. 1 shows a composite element according to the disclosed method.

FIG. 1 shows a composite element 2 according to the disclosed method. The composite element 2 is shown in a perspective view (A) in an assembled state: the sleeve element 4 is connected with the insert element 6.

Figure 2:
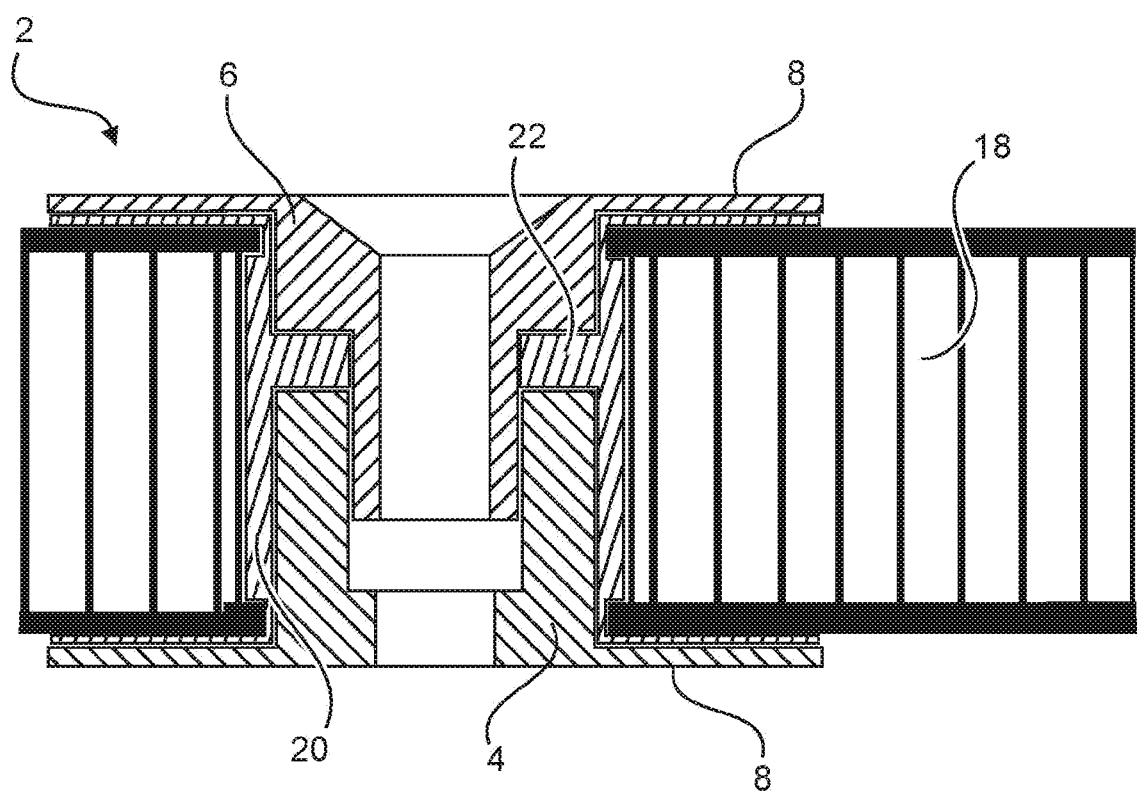
FIG. 2 shows a composite element arranged at a component.

The sleeve element 4 has small bores 3 serving for insertion of adhesive between the outer wall of the sleeve element 4 and a surrounding supporting core of a component 18 as well as its upper and lower top layers (see FIG. 2).

Views (B1), (B2) show the sleeve element 4 in a perspective view. View (B1) shows a flange 8 and a sleeve opening 10 of the sleeve element 4. View (B2) shows a perspective top view of the sleeve element 4. The flange 8 and the sleeve opening 10 are shown. The tubular formed sleeve 12 is formed to receive the insert element 6.

Views (C1), (C2) show the insert element 6 in a perspective view. View (C1) shows the flange 8 and an outer opening 14 of the insert element 6. View (C2) shows a perspective top view of the insert element 6. The flange 8 and the outer opening 14 are shown. The insert element 6 has an insert head 16 which connects with the tubular formed sleeve 12 of the sleeve element 4 and thus forms the composite element 2.

The composite element 2 in this example is made of titanium. It is also possible to use composite elements 2 of other materials (e.g. aluminum, steel, plastic).

The shown composite element 2 is only exemplary. Further designs are possible.

FIG. 2 shows a composite element 2 arranged at a component 18. The composite element 2 has the sleeve element 4 and the insert element 6. The insert element 6 is connected with the sleeve element 4. The component 18 has a supporting core (hatched) and an upper and a lower top layer.

The component 18 has a bore 20. In this embodiment an adhesive 22 has been applied on the sleeve element 4, its flange 8, the insert element 6 and its flange 8. The adhesive 22 secures the composite element 2 against premature falling out of the bore 20. The adhesive 22 has a protective function against intrusion of water, cleaning agent or contamination in the component.

The adhesive 22 can be introduced via the small bores 3 of the sleeve element 4 (see FIG. 1) between the outer wall of the sleeve element 4 and the enclosing supporting core of the component 18 as well as its upper and lower top layer.

Figure 3:
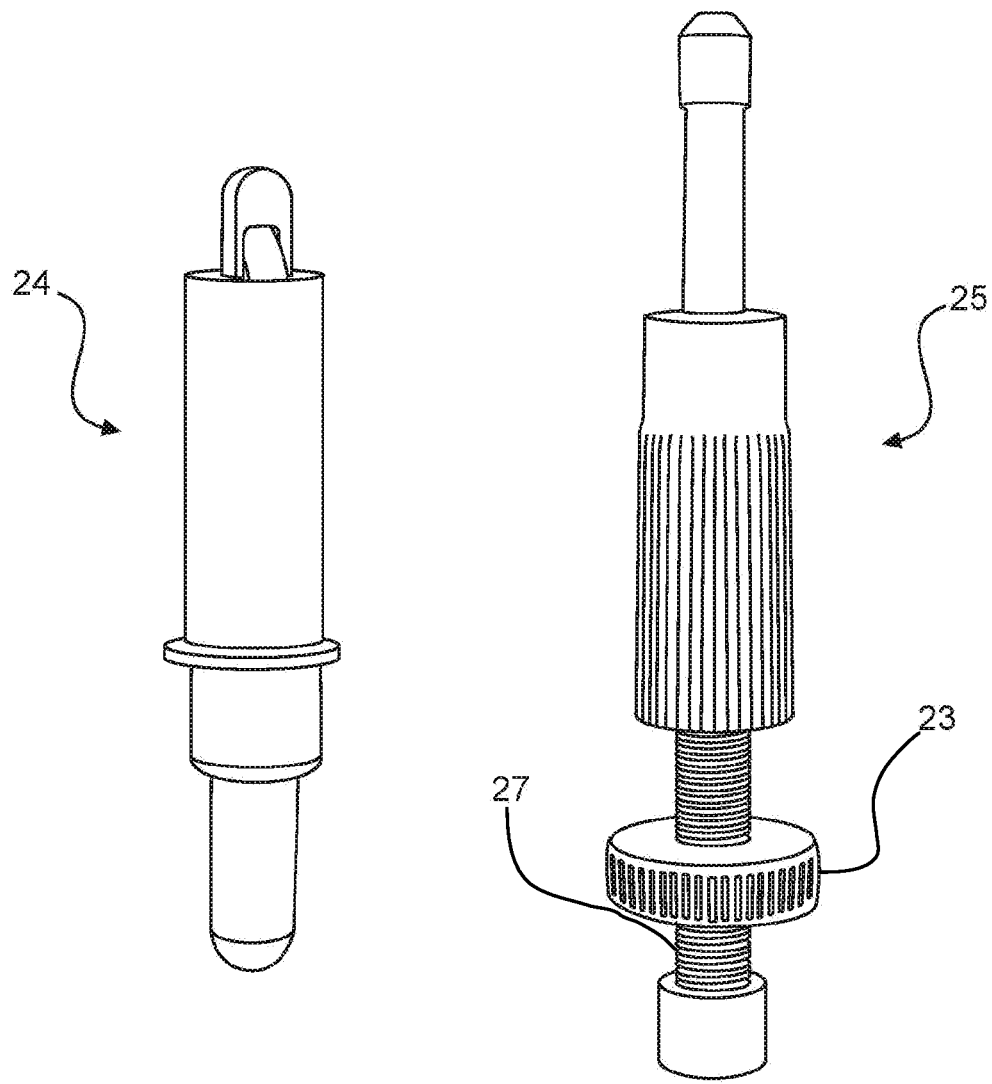
FIG. 3 shows two exemplary engagement apparatuses.

FIG. 3 shows two exemplary engagement apparatuses 24, 25. The engagement apparatus 24 has a self-locking mechanism. The engagement apparatus 25 has a screw-on mechanism. The engagement apparatus 24, 25 each has a preloaded force. It is spring-loaded as in engagement apparatus 24 or is obtained via a nut 23 and a threaded pin 27, as in engagement apparatus 25.

Figure 4:
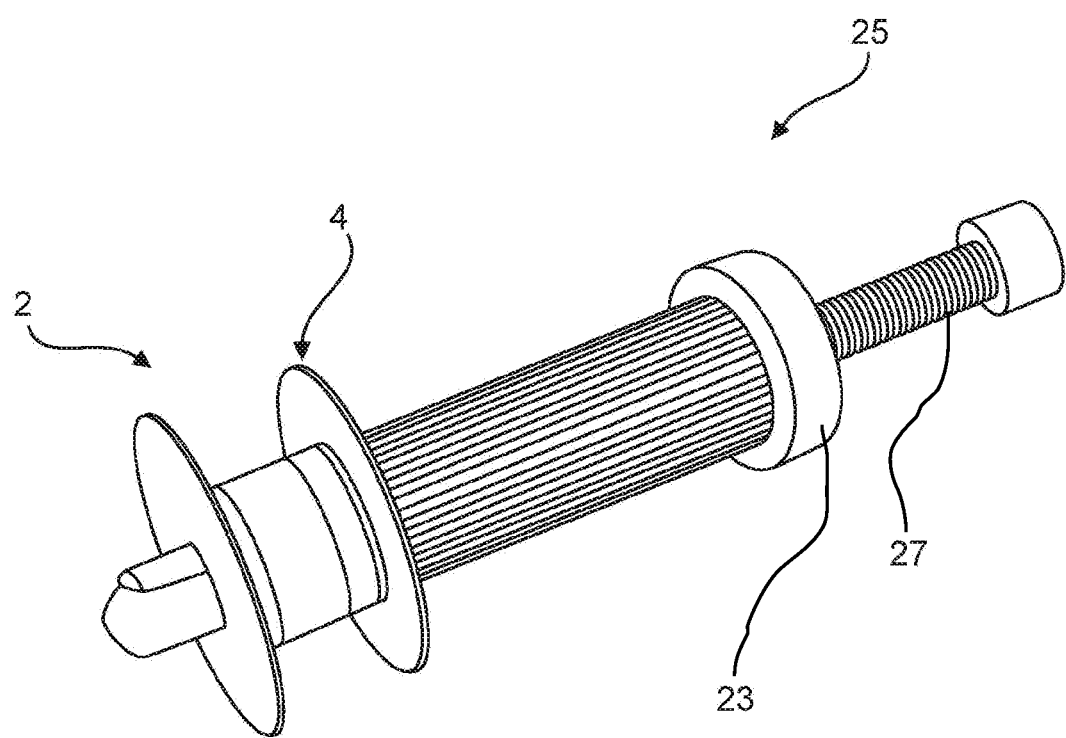
FIG. 4 shows one of the engagement apparatuses of FIG. 3 with a composite element.

FIG. 4 shows the engagement apparatuses 25 of FIG. 3 inserted in the composite element 2. The engagement apparatus 25 extends through the sleeve element 4 of the composite element 2. By the nut 23 and the threaded pin 27 the preloaded force of engagement apparatus 25 is transferred to the composite element 2. The composite element 2 is aligned and assembled in a not shown bore of a component.

Due to inserting the engagement apparatus 25 in the composite element 2, the composite element is provided with sufficient assembly stability (see also the following Figures). The direction from which the engagement apparatus 25 is inserted can be neglected.

Figure 5:
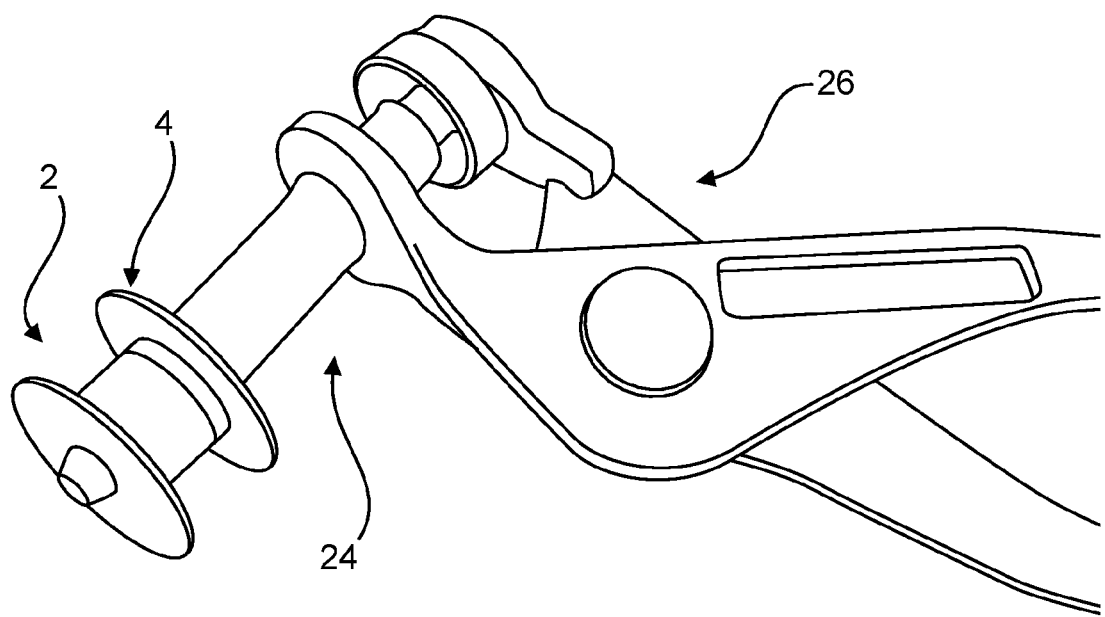
FIG. 5 shows one further of the engagement apparatuses of FIG. 3 with a composite element.

FIG. 5 shows the further engagement apparatuses 24 of FIG. 3 with the composite element 2. This engagement apparatus 24 is held with an engagement tool 26 and is inserted into the insert element 6 of the composite element 2. Also, by inserting this engagement apparatus 24 in composite element 2, the latter is provided with sufficient assembly stability (see also the following Figures). The direction from which the engagement apparatus 24 is inserted in composite element 2 can be neglected thereby.

Figure 6:
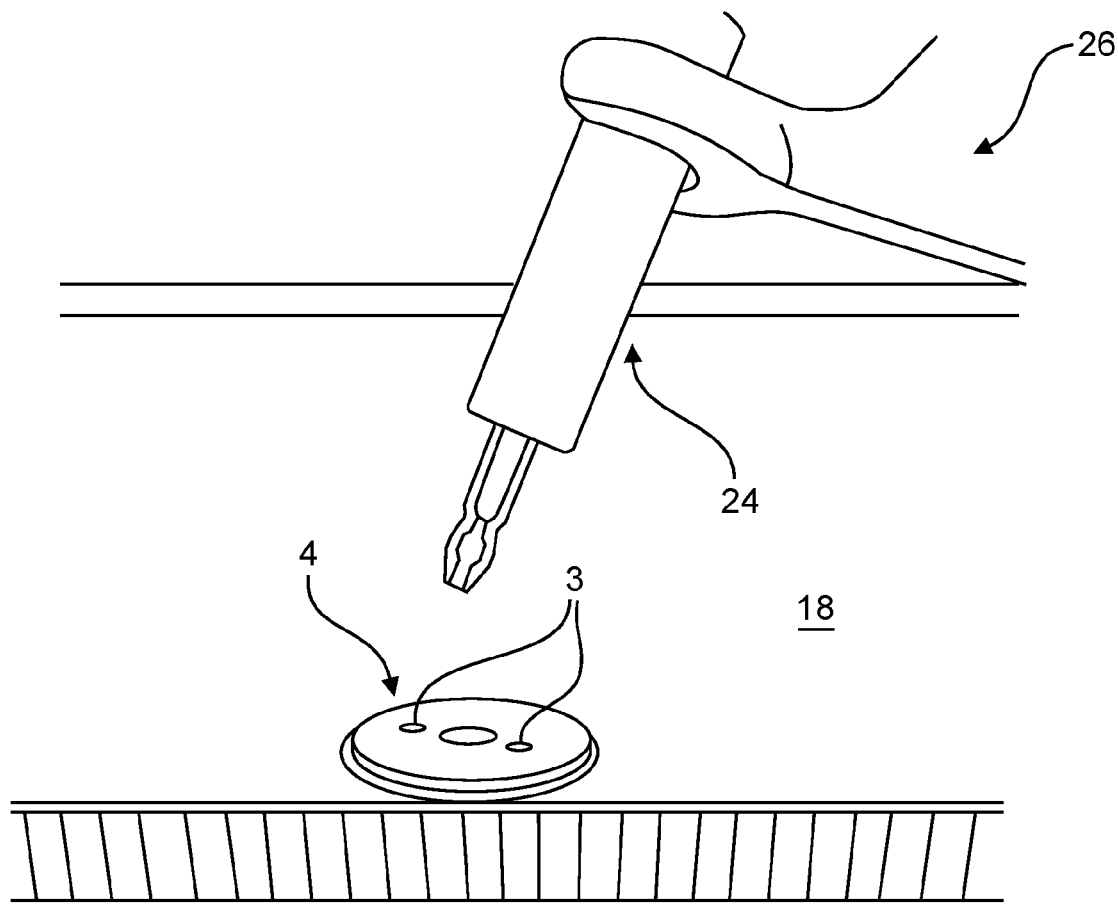
FIG. 6 shows an engagement apparatus during insertion in a composite element.

FIG. 6 shows an engagement apparatus 24 during insertion in the composite element 2. The engagement apparatus 24 is inserted in the sleeve element 4 of the composite element 2. The engagement apparatus 24 has a preloaded force which is introduced into the insert element 6, when the engagement apparatus 24 is inserted.

The composite element 2 is aligned and assembled in a bore of the component 18. Via the small bores 3 adhesive can be introduced between the outer wall of the sleeve element 4 and the enclosing supporting core of component 18 (see also FIG. 2).

Figure 7:
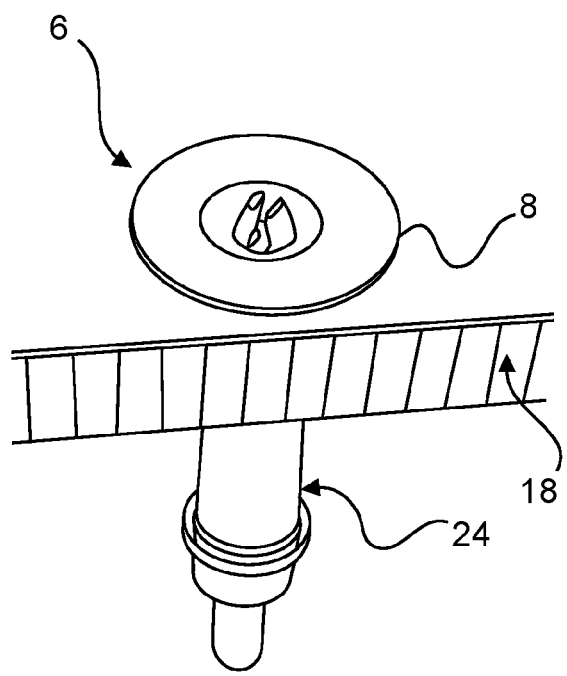
FIG. 7 shows an inserted engagement apparatus.

FIG. 7 shows the inserted engagement apparatus 24 in a composite element 2 which is arranged in a component 18. In a top view the insert element 6 is shown arranged in component 18. In this embodiment the engagement apparatus 24 is shown inserted in the sleeve element 4 and extends through the insert element 6.

Figure 8:
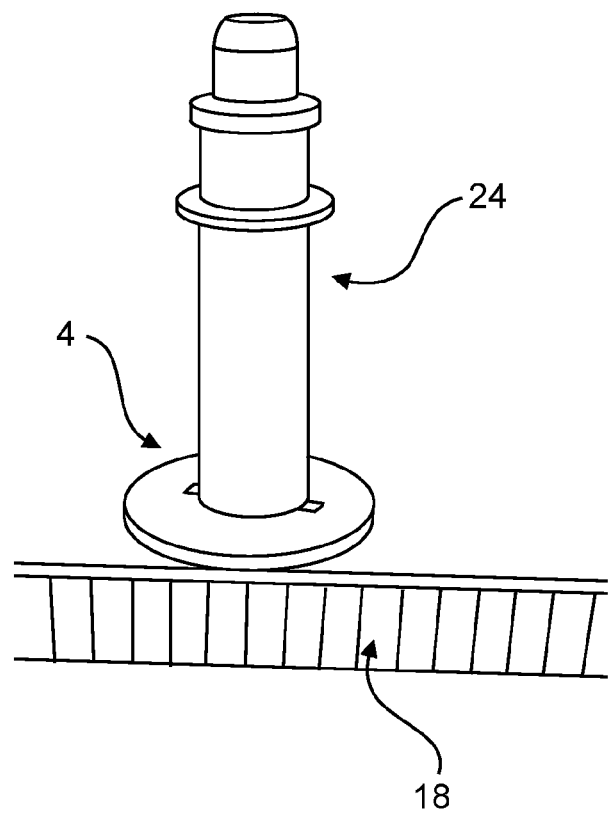
FIG. 8 shows the inserted engagement apparatus of FIG. 7.

FIG. 8 shows in a top view the engagement apparatus 24 of FIG. 7, as it is inserted into the sleeve element 4.

The above described embodiments can be combined in different manner. In particular aspects of the method can be used for embodiments of the apparatuses as well as use of the apparatuses and vice versa.

In addition, it is indicated, that "comprising" does not exclude other elements or steps and "one" or "a" does not exclude a plurality. Further it is indicated, that the features or steps, which are described in relation to one of the above embodiments, can also be used in combination with other features or steps of other above described embodiments. Reference signs in the claims are not to be construed as limitations.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for arranging at least one composite element at a component, wherein the at least one composite element comprises at least a sleeve element and at least an insert element, the method comprising the steps of:
    arranging the sleeve element in a bore of the component;
    connecting the sleeve element and the insert element, so that at least one composite element is formed;
    inserting an engagement apparatus in the at least one composite element, wherein the engagement apparatus aligns and assembles the sleeve element and the insert element to each other; and
    introducing, by the engagement apparatus, a preload into the composite element and, thereby, connecting the insert element to the sleeve element.

2. The method according to claim 1, wherein the engagement apparatus introduces a preload into the composite element.

3. The method according to claim 1, further comprising applying an adhesive in the bore and/or on the sleeve element and/or the insert element before arranging the sleeve element or the insert element.

4. The method according to claim 1, wherein the engagement apparatus provides a self-locking mechanism or a screw-on mechanism.

5. The method according to claim 1, wherein the engagement apparatus is inserted in the sleeve element or in the insert element.

6. The method according to claim 1, wherein the sleeve element is arranged at one side of the bore and the insert element is arranged on the opposite side of the bore.

7. The method according to claim 1, wherein the sleeve element and/or the insert element provides a flange.

8. The method according to claim 1, wherein the engagement apparatus is provided as guiding apparatus for the at least one composite element.

9. The method according to claim 1, wherein the engagement apparatus provides a spring force.

\* \* \* \* \*